US005780369A

United States Patent [19]
Allison et al.

[11] Patent Number: 5,780,369
[45] Date of Patent: Jul. 14, 1998

[54] SATURATED CELLULOSIC SUBSTRATE

[75] Inventors: John Patrick Allison, Marietta; Russell Lynn Dolsey, Roswell, both of Ga.

[73] Assignee: Kimberly-Clark Worldwide, Inc.

[21] Appl. No.: 885,654

[22] Filed: Jun. 30, 1997

[51] Int. Cl.$^6$ .................................................. B32B 5/06
[52] U.S. Cl. ..................... 442/384; 28/104; 28/112; 427/392; 442/153; 442/385; 442/387; 442/408
[58] Field of Search ......................... 442/153, 384, 442/385, 387, 408; 28/104, 112; 427/392

[56] References Cited

U.S. PATENT DOCUMENTS

| D. 239,566 | 4/1976 | Vogt | D59/2 R |
|---|---|---|---|
| D. 264,512 | 5/1982 | Rogers | D59/2 B |
| 3,016,599 | 1/1962 | Perry, Jr. | 28/78 |
| 3,341,394 | 9/1967 | Kinney | 161/72 |
| 3,404,647 | 10/1968 | Pohl et al. | 112/405 |
| 3,485,706 | 12/1969 | Evans | 161/72 |
| 3,486,168 | 12/1969 | Evans et al. | 161/169 |
| 3,649,400 | 3/1972 | Sawaki et al. | 156/148 |
| 3,655,862 | 4/1972 | Dorschner et al. | 264/290 |
| 3,692,618 | 9/1972 | Dorschner et al. | 161/72 |
| 3,704,198 | 11/1972 | Prentice | 161/148 |
| 3,705,068 | 12/1972 | Dobo et al. | 156/441 |
| 3,755,527 | 8/1973 | Keller et al. | 264/210 |
| 3,802,817 | 4/1974 | Matsuki et al. | 425/66 |
| 3,849,241 | 11/1974 | Butin et al. | 161/169 |
| 3,853,651 | 12/1974 | Porte | 156/73.6 |
| 3,855,046 | 12/1974 | Hansen et al. | 161/150 |
| 3,947,983 | 4/1976 | Brunette | 40/27 |
| 3,978,185 | 8/1976 | Butin et al. | 264/93 |
| 3,988,343 | 10/1976 | Lilyquist | 260/29.6 |
| 4,064,605 | 12/1977 | Akiyama et al. | 28/103 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,118,531 | 10/1978 | Hauser | 428/224 |
| 4,144,370 | 3/1979 | Boulton | 428/233 |
| 4,183,431 | 1/1980 | Schmidt et al. | 206/63.3 |
| 4,196,245 | 4/1980 | Kitson et al. | 428/198 |
| 4,340,563 | 7/1982 | Appel et al. | 264/518 |
| 4,392,315 | 7/1983 | Irving et al. | 40/27 |
| 4,405,297 | 9/1983 | Appel et al. | 425/72 |
| 4,434,204 | 2/1984 | Hartman et al. | 428/198 |
| 4,493,868 | 1/1985 | Meitner | 428/171 |
| 4,554,207 | 11/1985 | Lee | 428/288 |
| 4,612,226 | 9/1986 | Kennette et al. | 428/134 |
| 4,627,811 | 12/1986 | Greiser et al. | 425/72 S |
| 4,644,045 | 2/1987 | Fowells | 526/348 |
| 4,663,220 | 5/1987 | Wisneski et al. | 428/220 |
| 4,717,621 | 1/1988 | So et al. | 428/349 |
| 4,761,326 | 8/1988 | Barnes et al. | 428/219 |
| 4,781,966 | 11/1988 | Taylor | 428/152 |
| 4,808,467 | 2/1989 | Suskind et al. | 428/284 |
| 4,879,170 | 11/1989 | Radwanski et al. | 428/233 |
| 4,931,355 | 6/1990 | Radwanski et al. | 428/283 |
| 4,939,016 | 7/1990 | Radwanski et al. | 428/152 |
| 4,950,531 | 8/1990 | Radwanski et al. | 428/284 |
| 4,970,104 | 11/1990 | Radwanski et al. | 428/198 |
| 5,009,747 | 4/1991 | Viazmensky et al. | 162/115 |
| 5,031,775 | 7/1991 | Kane | 206/571 |
| 5,106,457 | 4/1992 | Manning | 162/115 |
| 5,108,820 | 4/1992 | Kaneko et al. | 428/198 |
| 5,137,600 | 8/1992 | Barnes et al. | 162/115 |
| 5,151,320 | 9/1992 | Homonoff et al. | 428/284 |
| 5,217,772 | 6/1993 | Brown et al. | 428/40 |
| 5,223,095 | 6/1993 | Kinsley, Jr. | 162/146 |
| 5,223,329 | 6/1993 | Amann | 428/198 |
| 5,284,703 | 2/1994 | Everhart et al. | 428/283 |
| 5,290,628 | 3/1994 | Lim et al. | 428/299 |
| 5,328,759 | 7/1994 | McCormack et al. | 428/283 |
| 5,336,552 | 8/1994 | Strack et al. | 428/224 |
| 5,389,202 | 2/1995 | Everhart et al. | 162/103 |
| 5,393,599 | 2/1995 | Quantrille et al. | 428/284 |
| 5,405,650 | 4/1995 | Boulanger et al. | 427/261 |
| 5,418,022 | 5/1995 | Anderson et al. | 428/35.2 |
| 5,431,991 | 7/1995 | Quantrille et al. | 428/109 |
| 5,459,912 | 10/1995 | Oathout | 28/105 |
| 5,475,903 | 12/1995 | Collins | 28/104 |
| 5,494,745 | 2/1996 | Vander Velden et al. | 428/354 |
| 5,523,118 | 6/1996 | Williams | 427/208.8 |
| 5,534,340 | 7/1996 | Gupta et al. | 428/286 |
| 5,573,841 | 11/1996 | Adam et al. | 428/219 |
| 5,587,225 | 12/1996 | Griesbach et al. | 428/198 |
| 5,595,828 | 1/1997 | Weber et al. | 428/537.5 |

FOREIGN PATENT DOCUMENTS

| 522791 | 3/1956 | Canada. |
|---|---|---|
| 0 586 924 | 3/1994 | European Pat. Off. |
| 92/08834 | 5/1992 | WIPO. |

OTHER PUBLICATIONS

"Superfine Thermoplastic Fibers" by V. A. Wente, Industrial and Engineering Chemistry, vol. 48, No. 8, pp. 1342–1346 (1956).

"Manufacture of Superfine Organic Fibers", by V. A. Wente et al., Navy Research Laboratory, Washington, D.C., NRL Report 4364 (111437), May 25, 1994, US Dept. of Commerce, Office of Technical Services.

"Melt Blowing—A One-Step Web Process for New Nonwoven Products" by R. R. Butin et al., Journal of the Technical Association of the Pulp and Paper Industry, vol. 56, No. 4, pp. 74–77 (1973).

Abstract of JP 05-85069 dated Apr. 6, 1993.
Abstract of JP 08-258417 dated Oct. 8, 1996.
Abstract of JP 08-232170 dated Sep. 10, 1996.
Abstract of JP 08-50452 dated Feb. 20, 1996.
Abstract of JP 07-119073 dated May 9, 1995.
Abstract of JP 5-96669 dated Apr. 20, 1993 (with attached Japanese text patent copy).

*Primary Examiner*—James J. Bell

[57] ABSTRACT

A saturated hydroentangled fibrous web which includes fibers and a saturant. The fibers include from about 20 to 100 percent by weight, based on the total weight of the fibers, of cellulosic fibers, and from 0 to about 70 percent by weight, based on the total weight of the fibers, of mercerized cellulosic fibers. From about 80 to 0 percent by weight of the fibers, based on the total weight of the fibers, are synthetic polymer fibers. Finally, at least 10 percent by weight of the fibers are mercerized cellulosic fibers, synthetic polymer fibers, or a mixture thereof. The saturant is present in the saturated fibrous web at a level of from about 25 to about 100 percent, based on the dry weight of the fibers. When synthetic polymer fibers are present in the web, the saturant may be adapted to wet synthetic polymer fibers. A second layer composed of a bonded nonwoven web may be present. Also provided is a method of preparing the saturated hydroentangled fibrous web.

33 Claims, No Drawings

SATURATED CELLULOSIC SUBSTRATE

BACKGROUND OF THE INVENTION

The present invention relates to polymer-reinforced or saturated substrates.

The reinforcement of paper by polymer impregnation (commonly referred to as latex saturation) is a long-established practice. The polymer employed typically is a synthetic material, most often a latex, and the paper may consist solely of cellulosic fibers or of a mixture of cellulosic and noncellulosic fibers. Polymer reinforcement is employed to improve one or more of such properties as dimensional stability, resistance to chemical and environmental degradation, resistance to tearing, embossability, resiliency, conformability, moisture and vapor transmission, and abrasion resistance, among others.

Saturated papers typically have been used as label print stock, base substrates for abrasive papers, and similar applications where strength is an essential requirement. A relatively heavy saturated paper has been used as a replacement for jeans labels which for many years were made of leather. As the fashion industry is moving toward a more "distressed" or washed appearance, jeans must endure increasingly severe wash treatments which may include any or all of the following: caustic, high temperature, stones, and enzymes. While these specialized treatments are proprietary to each individual jeans manufacturer and exact conditions are not available, jeans labels must be able to withstand increasingly harsh conditions and still remain intact and legible. Thus, there is a need for a more durable jeans label with improved internal integrity in order to meet the needs of this evolving market.

In addition to the application of a heavy saturated paper as a jeans label, it may be of market interest to have a "synthetic leather" substitute for plastic or vinyl in other applications such as garment embellishments or decorations including collars, sleeves, pocket flaps, etc. A saturated paper previously has been excluded from this application because, when folded or bent, the paper exhibits piping when creased or folded.

SUMMARY OF THE INVENTION

The present invention addresses some of the difficulties and problems discussed above by providing a saturated hydroentangled fibrous web which includes fibers and a saturant. The fibers include from about 20 to 100 percent by weight of cellulosic fibers and from 0 to about 70 percent by weight of mercerized cellulosic fibers, both based on the total weight of the fibers. From about 80 to 0 percent by weight of the fibers, based on the total weight of the fibers, may be synthetic polymer fibers. Finally, at least 10 percent by weight of the fibers are mercerized cellulosic fibers, synthetic polymer fibers, or a mixture thereof.

In general, the fibrous web may have a basis weight of from about 30 to about 250 grams per square meter (gsm). In certain embodiments, from about 10 to about 50 percent by weight of the fibers may be mercerized cellulosic fibers. In other embodiments, from about 10 to about 40 percent by weight of the fibers may be synthetic polymer fibers. In still other embodiments, both mercerized cellulosic fibers and synthetic polymer fibers may be present. By way of illustration only, the synthetic polymer fibers may be polyester or polyamide fibers.

The fibrous web may be hydroentangled by any known means before the web is saturated. Hydroentangling results in a plurality of entanglement loci in the fibrous web. For example, the fibrous web may have a number of entanglement loci in a range of from about 62 to about 560 per square cm. As another example, the fibrous web may have a number of entanglement loci in a range of from about 142 to about 390 per square cm.

The saturant is present in the saturated hydroentangled fibrous web at a level of from about 25 to about 100 percent, based on the dry weight of the fibers. When synthetic polymer fibers are present in the web, the saturant may be adapted to wet synthetic polymer fibers.

The present invention further provides a hydroentangled fibrous substrate which includes a first layer composed of fibers and having first and second surfaces and a second layer which is a bonded nonwoven web having first and second surfaces. The second surface of the first layer overlays the first surface of the second layer. From about 20 to 100 percent by weight of the fibers of the first layer, based on the total weight of the fibers, are cellulosic fibers, and from 0 to about 70 percent by weight of the fibers of the first layer, again based on the total weight of the fibers, are mercerized cellulosic fibers. From about 80 to 0 percent by weight of the fibers of the first layer, based on the total weight of the fibers, are synthetic polymer fibers. At least 10 percent by weight of the fibers of the first layer are mercerized cellulosic fibers, synthetic polymer fibers, or a mixture thereof.

The first layer of the hydroentangled fibrous substrate typically may have a basis weight of from about 20 gsm to about 250 gsm. In certain embodiments, from about 10 to about 50 percent by weight of the fibers in the first layer may be mercerized cellulosic fibers. In other embodiments, from about 10 to about 40 percent by weight of the fibers in the first layer may be synthetic polymer fibers. In still other embodiments, both mercerized cellulose fibers and synthetic polymer fibers may be present. By way of illustration only, the synthetic polymer fibers may be polyester or polyamide fibers.

The second layer of the hydroentangled fibrous substrate typically may have a basis weight of from about 6 gsm to about 40 gsm. Such layer is a bonded nonwoven web.

The fibrous substrate may be hydroentangled by any known means before the substrate is saturated. Hydroentangling, as noted earlier, results in a plurality of entanglement loci in the fibrous substrate. For example, the fibrous web may have a number of entanglement loci in a range of from about 62 to about 560 per square cm. As another example, the fibrous web may have a number of entanglement loci in a range of from about 142 to about 390 per square cm. The first layer may be hydroentangled into the second layer, or the second layer may be hydroentangled into the first layer. Alternatively, both layers may be hydroentangled into each other. Desirably, the first layer will be hydroentangled into the second layer.

A saturant is present in at least the first layer of the substrate at a level of from about 25 to about 100 percent, based on the dry weight of the fibers of the layer or layers in which the saturant is present. Thus, the saturant may be present in only the first layer or, desirably, in both the first layer and the second layer. When synthetic polymer fibers are present in either or both layers, the saturant may be adapted to wet synthetic polymer fibers. When saturant is present in both layers, the hydroentangled fibrous substrate properly may be referred to as a saturated hydroentangled fibrous substrate.

The present invention additionally provides a method of preparing a saturated hydroentangled fibrous web. The method includes providing a fibrous web composed at least in part of fibers. The fibrous web typically will have a basis weight of from about 30 gsm to about 250 gsm. From about 20 to 100 percent by weight, based on the total weight of the fibers, are cellulosic fibers, and from 0 to about 70 percent by weight are mercerized cellulosic fibers. From about 80 to 0 percent by weight of the fibers, based on the total weight of the fibers, are synthetic polymer fibers. At least about 10 percent by weight of the fibers will be mercerized cellulosic fibers, synthetic polymer fibers, or a mixture thereof. By way of example, from about 10 to about 50 percent by weight of the fibers may be mercerized cellulosic fibers. As another example, from about 10 to about 40 percent by weight of the fibers may be synthetic polymer fibers. The synthetic polymer fibers may be, by way of illustration only, polyester or polyamide fibers.

The fibrous web then is hydroentangled by any known means to introduce a plurality of entanglement loci in the web. For example, the hydroentangled fibrous web may have a number of entanglement loci in a range of from about 62 to about 560 per square cm. As another example, the hydroentangled fibrous web may have a number of entanglement loci in a range of from about 142 to about 390 per square cm.

The hydroentangled fibrous web is saturated at a level of from about 25 to about 100 percent, based on the dry weight of the fibers. If desired, the saturant may be adapted to wet synthetic polymer fibers.

The present invention additionally provides a method of preparing a hydroentangled fibrous substrate. The method involves: providing a first layer having first and second surfaces and composed of fibers; providing a second layer having first and second surfaces and composed of a bonded nonwoven web; overlaying the second surface of the first layer on the first surface of the second layer; hydroentangling the first and second layers to give a hydroentangled fibrous substrate; and saturating the first layer or both the first and second layers with a saturant a level of from about 25 to about 100 percent by dry weight, based on the dry weight of the fibers.

From about 20 to 100 percent by weight of the fibers of the first layer, based on the total weight of the of the fibers, are cellulosic fibers and from 0 to about 70 percent by weight of the fibers are mercerized cellulosic fibers. In addition, from about 80 to 0 percent by weight of the fibers of the first layer, based on the total weight of the fibers, are synthetic polymer fibers. At least 10 percent by weight of the fibers are mercerized cellulosic fibers, synthetic polymer fibers, or a mixture thereof.

The first layer typically has a basis weight of from about 20 gsm to about 250 gsm and the second layer has a basis weight of from about 6 gsm to about 40 gsm. In addition, from about 10 to about 50 percent by weight of the fibers of the first layer may be mercerized cellulosic fibers. Alternatively, from about 10 to about 40 percent by weight of the fibers of the first layer may be synthetic polymer fibers. For example, the synthetic polymer fibers may be polyester or polyamide fibers. When synthetic polymer fibers are present, the saturant may be adapted to wet synthetic polymer fibers. Finally, the hydroentangled fibrous substrate may have a number of entanglement loci in a range of from about 62 to about 560 per square cm. For example, the hydroentangled fibrous substrate may have a number of entanglement loci in a range of from about 142 to about 390 per square cm.

DETAILED DESCRIPTION OF THE INVENTION

As used herein, the term "hydroentangled" (or "hydraulically entangled" or any variation thereof) with reference to a fibrous web or substrate means the web or substrate has been subjected to a hydraulic entangling or similar procedure whereby streams or jets of a fluid are employed to entangle the fibers in the fibrous web or substrate. Such jets of fluid orient and entangle fibers in the Z direction, i.e., through the thickness of the web or substrate. Where a jet impinges the web or substrate, a distinct hole or depression is formed which represent a locus of fiber entanglement. For convenience, these jet impingement sites, or loci, are referred to collectively hereinafter as "entanglement loci." For example, hydraulic entangling may be accomplished by means of conventional hydraulic entangling equipment, such as that described in U.S. Pat. No. 3,485,706 to Evans, which is incorporated herein by reference. Another hydroentangling process which may be employed is described in U.S. Pat. Nos. 4,144,370 to Bouolton which also is incorporated herein by reference. See also U.S. Pat. Nos. 4,931, 355 and 4,879,170 to Radwanski et al., and U.S. Pat. Nos. 4,808,467 to Suskind et al., 4,612,226 to Kennette et.al., and 5,284,703 to Everhart et al., each of which is incorporated herein by reference.

The term "bonded nonwoven web" is used herein to mean any nonwoven web composed of continuous or discontinuous fibers laid down on a foraminous surface in a random manner to form a web, in which a plurality of such fibers have been bonded to one another, either concurrently with or subsequent to web formation. For example, the bonded nonwoven web may be a web prepared by a melt-extrusion process in which melt-extrusion of a thermoplastic polymer to form fibers is followed concurrently by web formation on a foraminous support. Such processes include, among others, meltblowing, coforming, and spunbonding. By way of illustration only, such processes are exemplified by the following references, each of which is incorporated herein by reference:

(a) meltblowing references include, by way of example, U.S. Pat. Nos. 3,016,599 to R. W. Perry, Jr., 3,704,198 to J. S. Prentice, 3,755,527 to J. P. Keller et al., 3,849,241 to R. R. Butin et al., 3,978,185 to R. R. Butin et al., and 4,663,220 to T. J. Wisneski et al. See, also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No. 4, pp. 74–77 (1973);

(b) coforming references include U.S. Pat. Nos. 4,100,324 to R. A. Anderson et al. and 4,118,531 to E. R. Hauser; and (c) spunbonding references include, among others, U.S. Pat. Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

Nonwoven webs prepared by such processes typically are bonded subsequent to web formation by, for example, pattern bonding. As used herein, the term "pattern bonding" refers to a process of bonding a nonwoven web in a pattern by the application of heat and pressure. Pattern bonding typically is carried out at a temperature in a range of from about 80° C. to about 180° C. and a pressure in a range of from about 150 to about 1,000 pounds per linear inch (about 59–178 kg/cm). The pattern employed typically will have from about 10 to about 250 bonds/inch$^2$ (about 1–40 bonds/cm$^2$) covering from about 5 to about 30 percent of the web surface area. Such pattern bonding is accomplished in accordance with known procedures. See, for example, U.S. Design Pat. No. 239,566 to Vogt, U.S. Design Pat. No. 264,512 to Rogers, U.S. Pat. No. 3,855,046 to Hansen et al., and U.S. Pat. No. 4,493,868, supra, for illustrations of bonding patterns and a discussion of bonding procedures, which patents are incorporated herein by reference.

The term "bonded nonwoven web" also includes a bonded carded web; the web may be pattern bonded or, if it includes bonding fibers, through air bonded. The term "carded web" is used herein to mean a nonwoven web prepared from staple fibers which are usually purchased in bales. The bales are placed in a picker which separates the fibers. Next, the fibers are sent through a combing or carding unit which further breaks apart and aligns the staple fibers in the machine direction so as to form a machine direction-oriented fibrous nonwoven web. Once the web has been formed, it is then bonded by one or more of several bonding methods.

The term "bonding fibers" has reference to bicomponent thermoplastic polymer fibers in which the first component has a melting point which is at least about 50° C. lower than the melting point of the second component. As used herein, the term "bicomponent thermoplastic polymer fibers" refers to fibers which have been formed from at least two thermoplastic polymers extruded from separate extruders but spun together to form one fiber. The polymers are arranged in substantially constantly positioned distinct zones across the cross-section of the bicomponent fibers and extend continuously along the length of the bicomponent fibers. The configuration of such a bicomponent fiber may be, for example, a sheath-core arrangement wherein one polymer is surrounded by another, lower melting polymer, or a side-by-side arrangement. Bicomponent fibers are taught in U.S. Pat. No. 5,108,820 to Kaneko et al., U.S. Pat. No. 5,336,552 to Strack et al., and European Pat. No. 0 586 924. The component polymers may be present in any desired ratio.

The term "melting point" and variations thereof are used herein only in a qualitative sense and are not meant to refer to any particular test procedure. Reference herein to a melting point (temperature) or range is meant only to indicate an approximate temperature or range at which a polymer melts to an extent sufficient to form interfiber bonds.

The term "interfiber bonds" is used herein to mean the bonding of one fiber to another, adjacent fiber, typically at or near juncture points where one fiber meets or crosses another fiber. Bonding generally results from the film-forming characteristics of an adhesive or binder or from the melting of an adhesive or binder or a portion of either or both of the adjacent fibers.

The term "through air bonding" is used herein to mean a process of bonding a nonwoven bicomponent fiber web. The process involves winding the web at least partially around a screen-covered drum which is enclosed in a hood. Air which is sufficiently hot to melt one of the polymers of which the fibers of the web are made (e.g., the sheath polymer of the bicomponent thermoplastic polymer fibers) is forced from the hood, through the web and into the perforated roller. The air velocity may be, by way of example, between 100 and 500 feet per minute and the dwell time may be as long as 6 seconds. The melting and resolidification of the polymer provide the bonding.

The term "through air bonding" also includes the use of a hot air knife as described in commonly assigned U.S. patent application Ser. No. 08/362,328, filed on Dec. 22, 1994, which is incorporated herein by reference. Briefly, a hot air knife is a device which focuses a stream of heated air at a high linear flow rate onto a carded nonwoven web. For example, the linear flow rate of the stream of heated air may be in a range of from about 300 to about 3,000 meters per minute and the temperature of the stream may be in a range of from about 90° C. to about 290° C. Higher temperatures may be used, depending upon the melting point of the polymer employed as the first or sheath component in the bicomponent thermoplastic polymer fibers present in the web. The stream of heated air is arranged and directed by at least one slot which typically has a width of from about 3 to about 25 mm and is oriented in a substantially cross-machine direction over substantially the entire width of the web. A plurality of slots may be employed, if desired, and they may be arranged next to or separate from each other. The at least one slot may be continuous or discontinuous and may be composed of closely spaced holes. The hot air knife has a plenum to distribute and contain the heated air prior to exiting the slot. The plenum pressure of the air usually is from about 2 to about 22 mm Hg. The hot air knife typically is positioned from about 6 to about 254 mm above the surface of the carded web.

The term "synthetic polymer fibers" is used herein to mean fibers prepared from any synthetic polymer known to those having ordinary skill in the art, such as thermoplastic polymers and thermosetting polymers.

The term "thermoplastic polymer" is used herein to mean a polymer that softens when exposed to heat and returns to its original condition when cooled to room temperature. Examples of thermoplastic polymers include, by way of illustration only, end-capped polyacetals, such as poly(oxymethylene) or polyformaldehyde, poly(trichloroacetaldehyde), poly(n-valeraldehyde), poly(acetaldehyde), and poly(propionaldehyde); acrylic polymers, such as polyacrylamide, poly(acrylic acid), poly(methacrylic acid), poly(ethyl acrylate), and poly(methyl methacrylate); fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), and poly(vinyl fluoride); polyamides, such as poly(6-aminocaproic acid) or poly(ε-caprolactam), poly(hexamethylene adipamide), poly(hexamethylene sebacamide), and poly(11-aminoundecanoic acid); polyaramides, such as poly(imino-1,3-phenyleneiminoisophthaloyl) or poly(m-phenylene isophthalamide); parylenes, such as poly-p-xylylene and poly(chloro-p-xylylene); polyaryl ethers, such as poly(oxy-2,6-dimethyl-1,4-phenylene) or poly(p-phenylene oxide); polyaryl sulfones, such as poly(oxy-1,4-phenylenesulfonyl-1,4-phenyleneoxy-1,4-phenylene-isopropylidene-1,4-phenylene) and poly(sulfonyl-1,4-phenylene-oxy-1,4-phenylenesulfonyl-4,4'-biphenylene); polycarbonates, such as poly(bisphenol A) or poly(carbonyldioxy-1,4-phenyleneisopropylidene-1,4-phenylene); polyesters, such as poly(ethylene terephthalate), poly(tetramethylene terephthalate), and poly(cyclohexylene-1,4-dimethylene terephthalate) or poly(oxymethylene-1,4-cyclohexylene-methyleneoxyterephthaloyl); polyaryl sulfides, such as poly(p-phenylene sulfide) or poly(thio-1,4-phenylene); polyimides, such as poly(pyromellitimido-1,4-phenylene);

polyolefins, such as polyethylene, polypropylene, poly(1-butene), poly(2-butene), poly(1-pentene), poly(2-pentene), poly(3-methyl-1-pentene), and poly(4-methyl-1-pentene); vinyl polymers, such as poly(vinyl acetate), poly(vinylidene chloride), and poly(vinyl chloride); diene polymers, such as 1,2-poly-1,3-butadiene, 1,4-poly-1,3-butadiene, polyisoprene, and polychloroprene; polystyrenes; copolymers of the foregoing, such as acrylonitrile-butadiene-styrene (ABS) copolymers; and the like.

Examples of thermosetting polymers include, by way of illustration only, alkyd resins, such as phthalic anhydride-glycerol resins, maleic acid-glycerol resins, adipic acid-glycerol resins, and phthalic anhydride-pentaerythritol resins; allylic resins, in which such monomers as diallyl phthalate, diallyl isophthalate diallyl maleate, and diallyl chlorendate serve as nonvolatile cross-linking agents in polyester compounds; amino resins, such as aniline-formaldehyde resins, ethylene urea-formaldehyde resins, dicyandiamide-formaldehyde resins, melamine-formaldehyde resins, sulfonamide-formaldehyde resins, and urea-formaldehyde resins; epoxy resins, such as cross-linked epichlorohydrin-bisphenol A resins; phenolic resins, such as phenol-formaldehyde resins, including Novolacs and resols; and thermosetting polyesters, silicones, and urethanes.

As used herein, the term "saturant" is synonymous with the term "binder" and is meant to include any polymeric material which may be used to bind the fibers of the fibrous web or nonwoven substrate together. The saturant may be applied as either a solution of a polymer in a suitable solvent or as a dispersion of very small polymer particles in a liquid phase, such as water, e.g., as a latex. For example, the saturant may be any of the latex binders commonly employed for reinforcing papers. Such binders are well known to those having ordinary skill in the art and include, by way of illustration only, polyacrylates, including polymethacrylates, poly(acrylic acid), poly(methacrylic acid), and copolymers of the various acrylate and methacrylate esters and the free acids; styrene-butadiene copolymers and carboxylated versions thereof; ethylene-vinyl acetate copolymers; nitrile rubbers or acrylonitrile-butadiene copolymers; poly(vinyl chloride); poly(vinyl acetate); ethylene-acrylate, copolymers; vinyl acetate-acrylate copolymers; neoprene rubbers or trans-1,4-polychloroprenes; cis-1,4-polyisoprenes; butadiene rubbers or cis- and trans-1,4-polybutadienes; and ethylenepropylene copolymers.

Broadly stated, the present invention relates to a hydroentangled substrate which is latex impregnated to produce an absorbent matrix with a high level of internal strength and flexibility for use in washable label applications. The hydroentangled substrate may consist of various levels of cellulose fiber, synthetic fiber and nonwoven fiber matrixes. The unique properties developed by the present invention provide exceptional strength and durability while maintaining drapeability and absorbence to printing inks or coatings.

The latex saturation of a hydroentangled substrate results in exceptional internal strength. The absorbent characteristic of the hydroentangled substrate results in a high level of latex add on of dry grams of latex per dry grams of fiber. This property can also be achieved with very absorbent cellulose webs. However, in the case of a highly saturated cellulose web the flexibility of the web is very low and even slight bending of the web results in piping of the surface along the fold line. Piping is the formation of raised ridges along the crease line of a fold that remain visible even when the substrate is unfolded. This is especially true in webs where the caliper or thickness is in the range of 0.50 to 1.0 mm. However, a highly saturated hydroentangled web of the present invention maintains a drapeable hand and may be bent or folded without piping.

In the normal wet laid process of paper formation on a fourdrinier paper machine, all fibers in the web are laid in the plane of the web as it proceeds through the paper machine. In a hydroentangled web, the Z orientation of a portion of the fibers results in increased internal bond of the hydroentangled web. The Z orientation of fibers during the hydroentangling process also results in minute holes in the matrix, providing open spaces for the flexing or bending of the individual fibers. Even after latex saturation, this flexibility is maintained.

As stated earlier, the present invention provides a saturated hydroentangled fibrous web which includes fibers and a saturant. The fibers include from about 20 to 100 percent by weight, based on the total weight of the fibers, of cellulosic fibers. From 0 to about 70 percent by weight of the fibers may be mercerized fibers. For example, from about 75 to 100 percent by weight of the fibers may be cellulosic fibers. As another example, from about 20 to about 60 of the cellulosic fibers may be mercerized cellulosic fibers. From about 80 to 0 percent by weight of the fibers, based on the total weight of the fibers, may be synthetic polymer fibers. For example, from about 10 to about 50 percent by weight of the fibers may be synthetic fibers. Finally, at least 10 percent by weight of the fibers are mercerized cellulosic fibers, synthetic polymer fibers, or a mixture thereof. In certain embodiments, from about 10 to about 50 percent by weight of the fibers may be mercerized cellulosic fibers. In other embodiments, from about 10 to about 40 percent by weight of the fibers may be synthetic polymer fibers. In still other embodiments, both mercerized cellulosic fibers and synthetic polymer fibers may be present. By way of illustration only, the synthetic polymer fibers may be polyester or polyamide fibers.

Sources of cellulosic fibers include, by way of illustration only, woods, such as softwoods and hardwoods; straws and grasses, such as rice, esparto, wheat, rye, and sabai; canes and reeds, such as bagasse; bamboos; woody stalks, such as jute, flax, kenaf, and cannabis; bast, such as linen and ramie; leaves, such as abaca and sisal; and seeds, such as cotton and cotton linters. Softwoods and hardwoods are the more commonly used sources of cellulosic fibers; the fibers may be obtained by any of the commonly used pulping processes, such as mechanical, chemimechanical, semichemical, and chemical processes. Examples of softwoods include, by way of illustration only, longleaf pine, shortleaf pine, loblolly pine, slash pine, Southern pine, black spruce, white spruce, jack pine, balsam fir, douglas fir, western hemlock, redwood, and red cedar. Examples of hardwoods include, again by way of illustration only, aspen, birch, beech, oak, maple and gum.

Mercerization, of course, is a procedure which is well known to those having ordinary skill in the art. An example of mercerized cellulosic fibers is that used in the examples, a bleached mercerized southern pine kraft pulp, designated HPZ, produced by Buckeye Cellulose Corporation.

In general, the saturated hydroentangled fibrous web may have a basis weight of from about 30 gsm to about 250 gsm. For example, the basis weight of the saturated hydroentangled web may be in a range of from about 100 gsm to about 220 gsm.

The fibrous web may be hydroentangled by any known means before the web is saturated. Hydraulic entangling may be carried out with any appropriate high pressure working fluid, such as, by way of example only, water. The working fluid flows through a manifold which evenly distributes the fluid to a series of individual holes or orifices. These holes or orifices may be, by way of illustration, from about 0.003 to about 0.015 inch (from about 0.07 to about 1.6 mm) in diameter. For example, hydroentangling may utilize a manifold produced by Honeycomb Systems incorporated of Biddeford, Me., containing a strip having 0.007-inch (about 0.18-mm) diameter orifices, 30 orifices per inch (about 12 orifices per cm), and one row of orifices. Many other manifold configurations and combinations may be used, however. For example, a single manifold may be used or several manifolds may be arranged in succession. As another example, the fibrous web may have a number of entanglement loci in a range of from about 62 to about 560 per square cm. As a further example, the fibrous web may have a number of entanglement loci in a range of from about 142 to about 390 per square cm.

In the hydraulic entangling process, the high pressure working fluid passes through the orifices at a pressure ranging from about 200 to about 2,000 pounds per square inch gage (psig) (from about 14 to about 140 kilograms per square centimeter, or kg/cm$^2$). The fluid impacts the web or substrate which is supported by a foraminous surface which may be, for example, a single plane mesh having a mesh count of from about 1,600 to about 10,000 per square inch (about 248–1,550 per square cm). The foraminous surface also may be a multiple plane mesh having a mesh count of from about 2,500 to about 40,000 per square inch (about 388–6,200 per square cm). As used herein, the term "mesh count" refers to a number which is the product of the number of wires in a wire mesh screen in both the machine (MD) and cross-machine (CD) directions in a given unit area. For example, a wire mesh screen having 100 wires per inch (about 15.5 wires per cm) in the machine direction and 100 wires per inch in the cross machine direction would have a mesh count of 10,000 per square inch (about 1,550 per square cm). Vacuum slots or other openings may be located directly beneath the hydroentangling manifold or beneath the foraminous surface downstream of the hydroentangling manifold so that excess fluid is withdrawn from the hydraulically entangled web or substrate.

The saturant is present in the saturated hydroentangled fibrous web at a level of from about 25 to about 100 percent by weight, based on the dry weight of the fibers. For example, the level of saturant in the saturated hydroentangled fibrous web may be in a range of from about 50 to about 100 percent by weight. As another example, the level of saturant in the saturated hydroentangled fibrous web may be in a range of from about 50 to about 80 percent by weight. When synthetic polymer fibers are present in the web, the saturant may be adapted to wet synthetic polymer fibers.

The present invention further provides a hydroentangled fibrous substrate which includes a first layer composed of fibers and having first and second surfaces and a second layer which is a bonded nonwoven web having first and second surfaces. The second surface of the first layer overlays the first surface of the second layer. From about 20 to 100 percent by weight of the fibers of the first layer, based on the total weight of the of the fibers, are cellulosic fibers and from 0 to about 70 percent by weight of the fibers of the first layer, again based on the total weight of the fibers, are mercerized cellulosic fibers. For example, from about 75 to about 100 percent by weight of the fibers may be cellulosic fibers. As another example, from about 20 to about 60 of the cellulosic fibers may be mercerized fibers. From about 80 to 0 percent by weight of the fibers of the first layer, based on the total weight of the fibers, are synthetic polymer fibers. At least 10 percent by weight of the fibers of the first layer are mercerized cellulosic fibers, synthetic polymer fibers, or a mixture thereof. For example, in certain embodiments, from about 10 to about 50 percent by weight of the fibers in the first layer may be mercerized cellulosic fibers. In other embodiments, from about 10 to about 40 percent by weight of the fibers in the first layer may be synthetic polymer fibers. In still other embodiments, both mercerized cellulose fibers and synthetic polymer fibers may be present. By way of illustration only, the synthetic polymer fibers may be polyester or polyamide fibers.

The first layer of the hydroentangled fibrous substrate typically may have a basis weight of from about 20 gsm to about 250 gsm. For example, the basis weight of the first layer may be in a range of from about 100 gsm to about 220 gsm.

A saturant is present in at least the first layer of the substrate at a level of from about 25 to about 100 percent, based on the dry weight of the fibers of the layer or layers in which the saturant is present. Thus, the saturant may be present in only the first layer or in both the first layer and the second layer. When synthetic polymer fibers are present in either or both layers, the saturant may be adapted to wet synthetic polymer fibers. Desirably, the saturant will be present in both the first and second layers.

The second layer of the hydroentangled fibrous substrate typically may have a basis weight of from about 6 gsm to about 40 gsm. Such layer is a bonded nonwoven web as already defined. Desirably, the bonded nonwoven web will be a spunbonded web. As is well known by those having ordinary skill in the art, the term "spunbonding" refers to the production of small diameter continuous filaments which are formed by extruding a molten thermoplastic polymer as filaments from a plurality of fine, usually circular, capillaries of a spinnerette, with the diameter of the extruded filaments then being rapidly reduced by, for example, eductive drawing.

Numerous spunbonded webs prepared from various thermoplastic polymers are commercially available. The most extensively utilized commercial materials are made from filaments of polyamides, polyesters, and polyolefins such as polyethylene and polypropylene, although other polymers, such as rayon, cellulose acetate, acrylics also may be employed. Exemplary of the commercially available spunbonded web materials that may be employed in the present invention are the gas-bonded nylon filament materials sold under the trademark Cerex® and the lightly needle-tacked polyester materials sold under the trademark Reemay® (Reemay, Inc., Old Hickory, Tenn.). Of course, other commercially available spunbonded web materials also may be employed with good results.

The fibrous substrate may be hydroentangled by any known means, as described earlier, before the substrate is saturated. Hydroentangling results in a plurality of entanglement loci in the web. For example, the number of entanglement loci may be in a range of from about 62 to about 560 per square cm. As another example, the number of entanglement loci may be in a range of from about 142 to about 390 per square cm.

The present invention additionally provides a method of preparing a saturated hydroentangled fibrous web. The method includes providing a fibrous web. The fibrous web typically will have a basis weight of from about 30 gsm to about 250 gsm. From about 20 to 100 percent by weight of the fibers are cellulosic fibers and from 0 to about 70 percent by weight of the fibers are mercerized cellulosic fibers, both based on the total weight of the fibers. From about 80 to 0 percent by weight of the fibers, based on the total weight of the fibers, are synthetic polymer fibers. At least about 10 percent by weight of the fibers will be mercerized cellulosic fibers, synthetic polymer fibers, or a mixture thereof. By way of example, from about 10 to about 50 percent by weight of the fibers may be mercerized cellulosic fibers. As another example, from about 10 to about 40 percent by weight of the fibers may be synthetic polymer fibers. The synthetic polymer fibers may be, by way of illustration only, polyester or polyamide fibers.

The fibrous web then is hydroentangled by any known means, as already described, to give a web having a plurality of entanglement loci. For example, the number of entanglement loci may be in a range of from about 62 to about 560 per square cm. As another example, the number of entanglement loci may be in a range of from about 142 to about 390 per square cm.

The hydroentangled fibrous web is saturated at a level of from about 25 to about 100 percent, based on the dry weight of the fibers. If desired, the saturant may be adapted to wet synthetic polymer fibers.

The present invention additionally provides a method of preparing a saturated hydroentangled fibrous substrate. The method involves: providing a first layer having first and second surfaces and composed of fibers; providing a second layer having first and second surfaces and composed of a bonded nonwoven web; overlaying the second surface of the first layer on the first surface of the second layer; hydroentangling the first and second layers to give a hydroentangled fibrous substrate; and saturating the hydroentangled fibrous web with a saturant a level of from about 25 to about 100 percent by dry weight, based on the dry weight of the fibers. Hydroentangling may be directed at either or both of the first and second layers. Desirably, hydroentangling will by directed at the first layer.

From about 20 to 100 percent by weight of the fibers of the first layer, based on the total weight of the fibers, are cellulosic fibers and from 0 to about 70 percent by weight of the fibers are mercerized cellulosic fibers, again based on the total weight of the fibers. In addition, from about 80 to 0 percent by weight of the fibers of the first layer, based on the total weight of the fibers, are synthetic polymer fibers. At least 10 percent by weight of the fibers are mercerized cellulosic fibers, synthetic polymer fibers, or a mixture thereof.

The first layer typically has a basis weight of from about 20 gsm to about 250 gsm and the second layer typically has a basis weight of from about 6 gsm to about 40 gsm. In addition, from about 10 to about 50 percent by weight of the fibers of the first layer may be mercerized cellulosic fibers. Alternatively, from about 10 to about 40 percent by weight of the fibers of the first layer may be synthetic polymer fibers. For example, the synthetic polymer fibers may be polyester or polyamide fibers. When synthetic polymer fibers are present, the saturant may be adapted to wet synthetic polymer fibers. Finally, the hydroentangled fibrous substrate may have a number of entanglement loci in a range of from about 62 to about 560 per square cm. For example, the hydroentangled fibrous substrate may have a number of entanglement loci in a range of from about 142 to about 390 per square cm.

The hydroentangling process variables generally are determined, at least in part, by the basis weight and density of the web or substrate being hydroentangled. Increased water jet pressure typically results in higher internal strength of the web as measured by delamination tests. Water jet pressure also contributes to a lowering of the stiffness of the saturated hydroentangled fibrous web. Similar enhancements of increased internal bond strength and reduced stiffness also may be achieved by maintaining the water pressure constant but subjecting the web to multiple passes under the hydroentangling jets. This may be done by using multiple banks or rows of jet manifolds. Finally, hydroentangling desirably is carried out with the first layer facing the hydroentangling jets. Depending upon such factors as jet pressure, the thickness of the first and second layers, and second layer fiber diameters, among others, it may be appropriate to conduct hydroentangling with the second layer facing the jets or to hydroentangle both sides, either simultaneously or sequentially.

Latex saturation of a fibrous web such as paper or a nonwoven usually results in improved internal strength but flexibility is often decreased as a result of the latex-fiber-latex bonds. However, the latex saturation of a hydroentangled web results in even more internal strength than expected as well as the added benefit of improved flexibility or drape. This gives the web a significant improvement in hand or feel of the substrate so that it feels more like a soft leather.

Typically, a hydroentangled substrate is significantly more absorbent than an otherwise identical substrate which has not been hydroentangled. In addition, the saturated hydroentangled substrate remains absorbent, even with relatively high levels of saturant. In contrast, conventional latex saturated cellulosic webs lose absorbent properties in proportion to the amount of saturant present in the web. Not only is the saturated hydroentangled substrate of the present invention still absorbent, but it also provides an excellent surface for absorbing printing inks or specialized coatings.

Latex saturation of the hydroentangled web or substrate may be carried out by any means known to those having ordinary skill in the art. Typically, the web or substrate is exposed to an excess of the impregnating dispersion or latex, run through a nip, and dried. One particular process passes the web through squeeze rolls which apply latex from a saturation latex basin and then provide the web to a number of drying cans held at temperatures of about 90° C. to about 150° C. The latex saturated web then is wound by a roll windup device and is ready for commercial use. However, the impregnating dispersion may be applied by other methods, such as brushing, doctor blading, spraying, and direct and offset gravure printing or coating and the present invention is not limited to any particular impregnating process. The hydroentangled web or substrate can be easily handled on ordinary equipment because of the inherent strength of the web. Drying of the substrate is rapid due to the open characteristic of the hydroentangled surface with minute holes or openings. This allows rapid evaporation of the water from the saturant. This open characteristic of the substrate also allows ink absorption to occur during printing.

Depending upon the basis weights of the first and second layers and the hydroentangling conditions, both sides of the hydroentangled fibrous substrate may be essentially same or different. In the former case, saturation of the substrate is most likely to involve both layers, whether or not the saturant wets the second layer fibers.

In the latter case, however, the first layer and second layers, though hydroentangled together to a significant degree, may retain their original characteristics. That is, the substrate may have, in effect, two different sides. If the saturant does not wet the second layer fibers, saturation generally will be limited to the first layer, regardless of the method used to apply saturant to the substrate. Whether or not the saturant wets the second layer fibers, the method of applying the saturant may reduce or minimize the presence of saturant in the second layer. For example, brushing or spraying the saturant only on the first layer side of the substrate may limit penetration of the saturant into the second layer.

The latex saturant may be composed of natural, synthetic or a combination of natural and synthetic polymers. In addition to latex, other soluble polymers and additives may be incorporated into the saturant for special end use properties. Such additives may include pigments, fillers, clay, titanium dioxide, crosslinking agents and rheology modifiers. For example, both crosslinking agents and rheology modifiers have been utilized with good results.

The present invention is further described by the examples which follow. Such examples, however, are not to be construed as limiting in any way either the spirit or the scope of the present invention. For convenience, the latex saturant employed in the examples is summarized below in Table 1.

TABLE 1

Latex Saturant

| Ingredient | % Solids | Parts Dry | Parts Wet |
|---|---|---|---|
| Water | — | — | 94.7 |
| Anionic acrylic polymer rheology modifier, an alkali-swellable emulsion of solubilized polyacrylate polymer chains (Acrysol ® ASE 75, Rohm & Haas, Spring House, PA) | 40 | 0.38 | 0.85 |
| Carboxylated styrene-butadiene copolymer latex binder or saturant (DL 220NA, Dow Chemical Company, Midland, MI)) | 46 | 100 | 217 |
| Antioxidant (Bostex ® 24, Akron Dispersions, Akron, OH) | 50 | 0.214 | 0.45 |
| Pigment dispersion 1 (colored pigment dispersion for imparting a tan color to a saturated substrate) | 46.8 | 7.2 | 15.5 |
| Pigment dispersion 2 (titanium dioxide dispersion (DuPont, Wilmington, DE) | 70 | 7.67 | 11 |
| Phenolic resin crosslinking agent, composed of phenol, cashew nut shell oil, formaldehyde (Bendix V 1315, Allied Signal, New York, NY) | 23.1 | 8 | 34.6 |
| Final saturant composition | 33 | 123.46 | 374.1 |

EXAMPLE 1

A wet cellulosic web composed of 50 percent by weight of northern softwood Kraft and 50 percent by weight of a bleached mercerized southern pulp (HPZ) and having a dry basis weight of 197 gsm was overlayed on an 8.5-gsm nonwoven web of spunbond nylon. The resulting substrate was hydroentangled from the cellulosic web side with four consecutive passes through the water jets of a hydroentangling unit having a waterjet pressure of 1,400 psi. The hydroentangled substrate was dried and saturated with latex saturant to an add-on level of 68 dry grams saturant to 100 dry grams of fiber. Samples were cured for six hours at 127° C. and then conditioned for 24 hours at 50 percent relative humidity and 20° C. prior to testing.

EXAMPLE 2

The procedure of Example 1 was repeated, except that the spunbond nylon web was replaced with a spunbond Reemay® polyester web having 4 denier per filament (dpf) fibers and a basis weight of 14 gsm, the saturant add-on level was 78 dry grams per 100 dry grams of fiber.

EXAMPLE 3

The procedure of Example 2 was repeated, except that the spunbond polyester web had a basis weight of 19 gsm and the saturant add-on level was 76 dry grams per 100 dry grams of fiber.

EXAMPLE 4

The procedure of Example 2 was repeated, except that the spunbond polyester web had a basis weight of 24 gsm and the saturant add-on level was 80 dry grams per 100 dry grams of fiber.

EXAMPLE 5

The wet cellulosic web described in Example 1 was hydroentangled and saturated as described in that example, except that hydroentangling involved only a single pass through the water jets of the hydroentangling unit. The saturant add-on level was 74 dry grams per 100 dry grams of fibers. The resulting saturated hydroentangled web was cured and conditioned as described in Example 1.

EXAMPLE 6

The procedure of Example 5 was repeated, except that hydroentangling was accomplished by two consecutive passes through the water jets of the hydroentangling unit and the saturant add-on level was 72 dry grams of saturant per 100 dry grams of fiber.

EXAMPLE 7

The procedure of Example 6 was repeated, except that hydroentangling was accomplished by three consecutive passes through the water jets of the hydroentangling unit.

For convenience, the examples are summarized in Table 2. In the table, "NSWK" represents northern softwood Kraft pulp, "NHWK" represents northern hardwood Kraft pulp, "HPZ" represents mercerized cellulosic fibers, "SB" represents a spunbonded web, and "PE" represents polyester. Hydroentanglement pressures are given in pounds per square inch, and saturant add-on is expressed as percent by weight on a dry weight basis.

TABLE 2

Summary of Examples

| | Substrate Construction | | Hydroentanglement | | Saturant |
|---|---|---|---|---|---|
| Ex. | 1st Layer | 2nd Layer | Pressure | Passes | Add-on |
| 1 | 50% NSWK 50% HPZ | Nylon SB 8.5 gsm | 1,400 | 4 | 68 |
| 2 | 50% NSWK 50% HPZ | PE SB 14 gsm | 1,400 | 4 | 78 |
| 3 | 50% NSWK 50% HPZ | PE SB 19 gsm | 1,400 | 4 | 76 |
| 4 | 50% NSWK 50% HPZ | PE SB 24 gsm | 1,400 | 4 | 80 |
| 5 | 50% NSWK 50% HPZ | None | 1,400 | 1 | 74 |
| 6 | 50% NSWK 50% HPZ | None | 1,400 | 2 | 72 |
| 7 | 50% NSWK 50% HPZ | None | 1,400 | 3 | 72 |

Each substrate was tested to determine both wet and dry tensile strengths. Dry tensile strength was measured using TAPPI Test Procedure T-494, with the results being reported in kg/16 mm. Wet tensile strength was measured by soaking a in a 1 percent by weight solution of Triton X-100 surfactant, a polyethoxylated alkylphenol from Union Carbide Corporation, Danbury, Conn. Each sample was allowed to soak for two hours. At the end of the soak period, the sample was removed from the surfactant solution and excess liquid was allowed to drain. The sample then was tested by the above procedure. To calculate the wet/dry tensile strength ratio, the wet tensile strength value was simply divided by the dry tensile strength value. All samples were tested in both the machine direction and the cross direction.

The Gurley stiffness of each sample also was determined in both the machine and cross directions. Testing was carried out in accordance with TAPPI Test Method T 543 pm-84, substantially as described in U.S. Pat. No. 5,248,309 to Serbiak et al.

Finally, each sample was subjected to a wash test to simulate the results of stone washing done by the manufacturers of jeans. At least three samples of each substrate were employed. Each test sample was a 2.5-inch square (about 6.4-cm square). Each sample was marked with identifying indicia on each side with a permanent felt-tip pen. The test procedure was as follows:

Caustic Soak

To a 1,000 ml wide-mouth Pyrex® beaker was added 400 ml of tap water. The pH of the water was adjusted 12±0.2 with a 50 percent by weight aqueous sodium hydroxide solution which was added dropwise. The resulting solution was placed on a hot plate in a hood and heated to 60° C. (140° F.). Up to 18 samples were placed in the beaker and allowed to soak for 45 minutes while maintaining temperature as close to 60° C. as possible. All samples must remain completely submerged during soaking.

Addition to British Disintegrator

At the end of the soaking period, the samples and soaking solution were carefully poured into the brass container of a British Disintegrator. An additional 600 ml of tap water at 52° C.–60° C. (125° F.–140° F.) then was added to the container. To the container was added 25 ml of Clorox® bleach (5.25 percent sodium hypochlorite bleach). The pH of the solution in the container should be 10.5. The brass container was placed in position, locked in place, and the agitator lowered. The top of the container was covered with the brass lid. The switch was turned on and the timer started.

Eight minutes in the Disintegrator is equivalent to 1,000 wash cycles (25 revolutions of the agitator represents one cycle). After eight minutes, the machine was shut off and the cover removed. Using latex gloves, one sample of each substrate being tested was removed and placed on folded paper towels to dry. These steps were repeated after 16 (2,000 cycles) and 24 minutes (3,000 cycles). The test may be extended to 6,000 or 7,000 cycles, if warranted. Samples are rated as passing or failing. A good sample at 1,000 cycles generally shows no damage. At 2,000 cycles, a good sample may show minor ply separation at a corner. A good sample at 3,000 cycles will be intact with possibly minor edge fraying or delamination. A failed sample may have plies almost separated or may be in two or more pieces.

The tensile strength, Gurley stiffness, and wash test results for the substrates prepared in the foregoing examples are summarized in Tables 3 and 4.

TABLE 3

Tensile Strength Results

| Ex. | Dry[a] | | Wet[a] | | Wet/Dry Ratio | |
|---|---|---|---|---|---|---|
| | MD | CD | MD | CD | MD | CD |
| 1 | 9.63 | 5.34 | 8.63 | 5.19 | 0.90 | 0.97 |
| 2 | 11.39 | 5.44 | 9.47 | 6.75 | 0.83 | 1.24 |
| 3 | 12.11 | 6.43 | 10.23 | 7.06 | 0.84 | 1.10 |
| 4 | 12.26 | 7.54 | 10.64 | 7.38 | 0.87 | 0.98 |
| 5 | 13.75 | 8.33 | 11.38 | 7.61 | 0.83 | 0.91 |
| 6 | 12.08 | 5.49 | 10.12 | 5.91 | 0.84 | 1.08 |
| 7 | 9.33 | 5.18 | 7.79 | 5.31 | 0.83 | 1.02 |

[a] In kg/15 mm.

TABLE 4

Other Test Results

| Ex. | MD Wet Delam.[a] | Gurley Stiffness | | Wash Test |
|---|---|---|---|---|
| | | MD | CD | Cycles |
| 1 | >1,000 | 725 | 275 | >6,000 |
| 2 | — | 1377 | 383 | >6,000 |
| 3 | — | 1399 | 366 | >6,000 |
| 4 | — | 1843 | 383 | >6,000 |
| 5 | 1,000 | 2956 | 899 | >6,000 |
| 6 | >1,000 | 1445 | 333 | >6,000 |
| 7 | >1,000 | 866 | 213 | >6,000 |

[a] In g/15 mm

The data summarized in Tables 3 and 4 illustrate the combination of high internal bond strength, excellent resistance to harsh laundering conditions, and suppleness in a web or substrate of the present invention. More particularly, hydroentanglement of the web or substrate provides improved integrity of the web or substrate and also improves the flexibility of the finished, saturated material. Experience has shown that attempts to improve durability by increasing the basis weight of the material or by increasing the amount of saturant usually result in a stiffer, more inflexible web or substrate. The unique combination of hydroentanglement and high saturant addition result in both improved durability and improved flexibility.

While the specification has been described in detail with respect to specific embodiments thereof, it will be appreciated by those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A saturated hydroentangled fibrous web comprising:

a fibrous web having a plurality of hydroentanglement loci as a consequence of subjecting the web to high pressure fluid jets, the fibrous web being comprised of fibers, in which
from about 20 to 100 percent by weight, based on the total weight of the fibers, are cellulosic fibers;
from 0 to about 70 percent by weight, based on the total weight of the fibers, are mercerized cellulosic fibers;
from about 80 to 0 percent by weight of the fibers, based on the total weight of the fibers, are synthetic polymer fibers; and at least 10 percent by weight of the fibers are mercerized cellulosic fibers, synthetic polymer fibers, or a mixture thereof; and a saturant which is present in the saturated fibrous web at a level of from about 25 to about 100 percent, based on the dry weight of the fibers.

2. The saturated hydroentangled fibrous web of claim 1, in which the saturant is adapted to wet synthetic polymer fibers.

3. The saturated hydroentangled fibrous web of claim 1, in which the fibrous web has a basis weight of from about 30 to about 250 grams per square meter.

4. The saturated hydroentangled fibrous web of claim 1, in which from about 10 to about 50 percent by weight of the fibers are mercerized cellulosic fibers.

5. The saturated hydroentangled fibrous web of claim 2, in which from about 10 to about 40 percent by weight of the fibers are synthetic polymer fibers.

6. The saturated hydroentangled fibrous web of claim 5, in which the synthetic polymer fibers are polyester or polyamide fibers.

7. The saturated hydroentangled fibrous web of claim 1, in which the fibrous web has a number of entanglement loci in a range of from about 62 to about 560 per square cm.

8. The saturated hydroentangled fibrous web of claim 1, in which the fibrous web has a number of entanglement loci in a range of from about 142 to about 390 per square cm.

9. A hydroentangled fibrous substrate comprising:
a first layer having first and second surfaces and comprised of fibers;
a second layer having first and second surfaces, with the second surface of the first layer overlaying the first surface of the second layer, which second layer comprises a bonded nonwoven web; and
a saturant which is present in at least the first layer;
wherein:
from about 20 to 100 percent by weight of the fibers of the first layer, based on the total weight of the of the fibers, are cellulosic fibers;
from 0 to about 70 percent by weight of the fibers of the first layer, based on the total weight of the fibers, are mercerized cellulosic fibers;
from about 80 to 0 percent by weight of the fibers of the first layer, based on the total weight of the fibers, are synthetic polymer fibers; and
at least 10 percent by weight of the fibers of the first layer are mercerized cellulosic fibers, synthetic polymer fibers, or a mixture thereof; and
the saturant is present in at least the first layer at a level of from about 25 to about 100 percent, based on the dry weight of the fibers.

10. The hydroentangled fibrous substrate of claim 9, in which the saturant is adapted to wet synthetic polymer fibers.

11. The hydroentangled fibrous substrate of claim 9, in which the first layer has a basis weight of from about 20 to about 250 grams per square meter.

12. The hydroentangled fibrous substrate of claim 9, in which from about 10 to about 50 percent by weight of the fibers of the first layer are mercerized cellulosic fibers.

13. The hydroentangled fibrous substrate of claim 10, in which from about 10 to about 40 percent by weight of the fibers of the first layer are synthetic polymer fibers.

14. The hydroentangled fibrous substrate of claim 13, in which the synthetic polymer fibers are polyester or polyamide fibers.

15. The hydroentangled fibrous substrate of claim 9, in which the fibrous substrate has a number of entanglement loci in a range of from about 62 to about 560 per square cm.

16. The hydroentangled fibrous substrate of claim 9, in which the fibrous substrate has a number of entanglement loci in a range of from about 142 to about 390 per square cm.

17. A method of preparing a saturated hydroentangled fibrous web, the method comprising:
providing a fibrous web comprised of fibers, in which
from about 20 to 100 percent by weight, based on the total weight of the fibers, are cellulosic fibers;
from 0 to about 70 percent by weight of the fibers, based on the total weight of the fibers, are mercerized cellulosic fibers;
from about 80 to 0 percent by weight of the fibers, based on the total weight of the fibers, are synthetic polymer fibers; and
at least 10 percent by weight of the fibers are mercerized cellulosic fibers, synthetic polymer fibers, or a mixture thereof;
hydroentangling the fibrous web; and
saturating the hydroentangled fibrous web with a saturant a level of from about 25 to about 100 percent by dry weight, based on the dry weight of the fibers.

18. The method of claim 17, in which the saturant is adapted to wet synthetic polymer fibers.

19. The method of claim 17, in which the fibrous web has a basis weight of from about 30 to about 250 grams per square meter.

20. The method of claim 17, in which from about 10 to about 50 percent by weight of the fibers are mercerized cellulosic fibers.

21. The method of claim 18, in which from about 10 to about 40 percent by weight of the fibers are synthetic polymer fibers.

22. The method of claim 21, in which the synthetic polymer fibers are polyester or polyamide fibers.

23. The method of claim 17, in which the hydroentangled fibrous web has a number of entanglement loci in a range of from about 62 to about 560 per square cm.

24. The method of claim 17, in which the hydroentangled fibrous web has a number of entanglement loci in a range of from about 142 to about 390 per square cm.

25. A method of preparing a saturated hydroentangled fibrous substrate, the method comprising:
providing a first layer having first and second surfaces and comprised of fibers;
providing a second layer having first and second surfaces and comprised of a bonded nonwoven web;
overlaying the second surface of the first layer on the first surface of the second layer;
hydroentangling the first and second layers to give a hydroentangled fibrous substrate; and
saturating the hydroentangled fibrous web with a saturant at a level of from about 25 to about 100 percent by dry weight, based on the dry weight of the fibers;
wherein:
from about 20 to 100 percent by weight of the fibers of the first layer, based on the total weight of the fibers, are cellulosic fibers;
from 0 to about 70 percent by weight of the fibers of the first layer, based on the total weight of the fibers, are mercerized fibers;
from about 80 to 0 percent by weight of the fibers of the first layer, based on the total weight of the fibers, are synthetic polymer fibers; and at least 10 percent by weight of the fibers are mercerized cellulosic fibers, synthetic polymer fibers, or a mixture thereof.

26. The method of claim 25, in which the saturant is adapted to wet synthetic polymer fibers.

27. The method of claim 25, in which the first layer has a basis weight of from about 20 to about 250 grams per square meter.

28. The method of claim 25, in which the second layer has a basis weight of from about 6 to about 40 grams per square meter.

29. The method of claim 25 in which from about 10 to about 50 percent by weight of the fibers of the first layer are mercerized cellulosic fibers.

30. The method of claim 25, in which from about 10 to about 40 percent by weight of the fibers of the first layer are synthetic polymer fibers.

31. The method of claim 30, in which the synthetic polymer fibers are polyester or polyamide fibers.

32. The method of claim 25, in which the hydroentangled fibrous substrate has a number of entanglement loci in a range of from about 62 to about 560 per square cm.

33. The method of claim 25, in which the hydroentangled fibrous substrate has a number of entanglement loci in a range of from about 142 to about 390 per square cm.

* * * * *